United States Patent

Sigwart et al.

[11] Patent Number: 6,111,147
[45] Date of Patent: Aug. 29, 2000

[54] PROCESS FOR PREPARING POLYTETRAHYDROFURAN AND DERIVATIVES THEREOF

[75] Inventors: Christoph Sigwart, Schriesheim; Karsten Eller, Ludwigshafen; Rainer Becker, Bad Duerkheim; Klaus-Dieter Plitzko, Limburgerhof; Rolf Fischer, Heidelberg; Frank Stein, Bad Duerkheim; Ulrich Mueller, Neustadt; Michael Hesse, Worms, all of Germany

[73] Assignee: BASF Aktiengesellschaft, Ludwigshafen, Germany

[21] Appl. No.: 09/269,210

[22] PCT Filed: Sep. 23, 1997

[86] PCT No.: PCT/EP97/05204

§ 371 Date: Apr. 1, 1999

§ 102(e) Date: Apr. 1, 1999

[87] PCT Pub. No.: WO98/15589

PCT Pub. Date: Apr. 16, 1998

[30] Foreign Application Priority Data

Oct. 9, 1996 [DE] Germany ............... 196 41 481

[51] Int. Cl.[7] .......................... C07C 43/10; C07C 43/11; C07C 69/76; C07C 67/24
[52] U.S. Cl. .................. 568/617; 568/606; 560/103; 560/240
[58] Field of Search ................ 560/240, 103; 568/609, 617

[56] References Cited

U.S. PATENT DOCUMENTS 3,893,947  7/1975  Young .................... 252/439
4,485,005  11/1984  O'Hara .
5,773,648  6/1998  Becker et al. .

FOREIGN PATENT DOCUMENTS 44 33 606  3/1996  Germany .
195 07 399  9/1996  Germany .
195 27 532  1/1997  Germany .
WO 96/09335  3/1996  WIPO .

*Primary Examiner*—Johann Richter
*Assistant Examiner*—Brian J. Davis
*Attorney, Agent, or Firm*—Oblon, Spivak, McClelland, Maier & Neustadt, P.C.

[57] ABSTRACT

Polytetrahydrofuran, copolymers of tetrahydrofuran and 2-butyne-1,4-diol, diesters of these polymers with $C_2$–$C_{20}$-monocarboxylic acids or monoesters of these polymers with $C_1$–$C_{10}$-monocarboxylic acids are prepared by polymerization of tetrahydrofuran in the presence of one of the telogens water, 1,4-butanediol, 2-butyne-1,4-diol, polytetrahydrofuran having a molecular weight of from 200 to 700 Dalton, a $C_1$–$C_{10}$-monocarboxylic acid or an anhydride of a $C_2$–$C_{20}$-monocarboxylic acid or a mixture of these telogens over a heterogeneous supported catalyst which comprises a catalytically active amount of an oxygen-containing molybdenum and/or tungsten compound on an oxidic support material and which has been calcined at from 500° C. to 1000° C. after application of the precursor compounds of the oxygen-containing molybdenum and/or tungsten compounds onto the support material precursor, wherein the catalyst is activated by treatment with a reducing agent before it is used as a polymerization catalyst.

8 Claims, No Drawings

PROCESS FOR PREPARING POLYTETRAHYDROFURAN AND DERIVATIVES THEREOF

This application is a 371 of PCT/EP97/05204 filed Sep. 23, 1997.

FIELD OF THE INVENTION

The present invention relates to an improved process for preparing polytetrahydrofuran, copolymers of tetrahydrofuran and 2-butyne-1,4-diol, diesters of these polymers with $C_2$–$C_{20}$-monocarboxylic acids or monoesters of these polymers with $C_1$–$C_{10}$-monocarboxylic acids by polymerization of tetrahydrofuran in the presence of one of the telogens water, 1,4-butanediol, 2-butyne-1,4-diol, polytetrahydrofuran having a molecular weight of from 200 to 700 Dalton, a $C_1$–$C_{10}$-monocarboxylic acid or an anhydride of a $C_2$–$C_{20}$-monocarboxylic acid or a mixture of these telogens over a heterogeneous supported catalyst which comprises a catalytically active amount of an oxygen-containing molybdenum and/or tungsten compound on an oxidic support material and which has been calcined at from 500° C. to 1000° C. after application of the precursor compounds of the oxygen-containing molybdenum and/or tungsten compounds onto the support material precursor.

Polytetrahydrofuran ("PTHF"), also known as poly (oxybutylene glycol), is a versatile intermediate in the plastics and synthetic fibers industries and serves, inter alia, for the preparation of polyurethane, polyester and polyamide elastomers for whose preparation it is used as diol component. In addition, polytetrahydrofuran as well as some of its derivatives is a valuable auxiliary in many applications, for example as dispersant or for deinking waste paper.

In industry, PTHF is advantageously prepared by polymerization of tetrahydrofuran over suitable catalysts in the presence of reagents whose addition makes it possible to control the length of the polymer chains and thus to set the mean molecular weight to the desired value (chain-termination reagents or "telogens"). The control is effected here by selection of type and amount of the telogen. Selection of suitable telogens makes it possible to introduce additional functional groups at one end or both ends of the polymer chain. Thus, for example, the monoesters or diesters of PTHF can be prepared by using carboxylic acids or carboxylic anhydrides as telogens. Other telogens, for example those having two hydroxy groups such as 1,4-butanediol, 2-butyne-1,4-diol or low molecular weight PTHF not only act as chain-termination reagents, but are also incorporated into the growing polymer chain of the PTHF. In this way, the PTHP can also be chemically modified. An example of this is the use of the telogen 2-butyne-1,4-diol whose addition leads to the presence of a proportion of C≡C triple bonds in the polymer chains of the PTHF.

PTHF modified in this way can be further altered chemically at these points by means of the reactivity of these triple bonds, for example by hydrogenation of the triple bonds to double bonds, by subsequent grafting-on of other monomers for adjusting the properties of the polymer, crosslinking to form polymers having a comparatively rigid structure, or other conventional procedures of polymer chemistry. The complete hydrogenation of the triple bonds present is likewise possible and generally leads to PTHF having a particularly low color number.

DE-A 44 33 606 describes a process for preparing PTHF, PTHF diesters of $C_2$–$C_{20}$-monocarboxylic acids or PTHF monoesters of $C_1$–$C_{10}$-monocarboxylic acids by polymerization of tetrahydrofuran over a heterogeneous catalyst in the presence of one of the telogens water, 1,4-butanediol, PTHF having a molecular weight of from 200 to 700 Dalton, a $C_1$–$C_{10}$-monocarboxylic acid or an anhydride of a $C_2$–$C_{20}$-monocarboxylic acid or a mixture of these telogens, with the catalyst being a supported catalyst which comprises a catalytically active amount of an oxygen-containing tungsten or molybdenum compound or a mixture thereof on an oxidic support material and which has been calcined at from 500° C. to 1000° C. after application of the precursor compounds of the oxygen-containing molybdenum and/or tungsten compounds onto the support material precursor.

WO 96/09335 teaches a process for preparing PTHF or PTHF monoesters of $C_1$–$C_{10}$-monocarboxylic acids by polymerization of tetrahydrofuran over a heterogeneous catalyst in the presence of one of the telogens water, 1,4-butanediol, PTHF having a molecular weight of from 200 to 700 Dalton, a $C_1$–$C_{10}$-monocarboxylic acid or a mixture of these telogens, with the catalyst being a supported catalyst which comprises a catalytically active amount of an oxygen-containing tungsten or molybdenum compound or a mixture thereof on an oxidic support material and which has been calcined at from 500° C. to 1000° C. after application of the precursor compounds of the oxygen-containing molybdenum and/or tungsten compounds onto the support material precursor.

SUMMARY OF THE INVENTION

It is an object of the present invention to increase the catalytic activity of the THF polymerization catalysts described in DE 44 33 606 or WO 96/09335 in order to achieve higher polymer yields and/or space-time yields, thus improving the economics of the process which depend decisively on the productivity of the catalyst.

DETAILED DESCRIPTION OF THE PREFERRED EMBODIMENTS

We have found that this object is achieved by an improved process for preparing polytetrahydrofuran, copolymers of tetrahydrofuran and 2-butyne-1,4-diol, diesters of these polymers with $C_2$–$C_{20}$-monocarboxylic acids or monoesters of these polymers with $C_1$–$C_{10}$-monocarboxylic acids by polymerization of tetrahydrofuran in the presence of one of the telogens water, 1,4-butanediol, 2-butyne-1,4-diol, polytetrahydrofuran having a molecular weight of from 200 to 700 Dalton, a $C_1$–$C_{10}$-monocarboxylic acid or an anhydride of a $C_2$–$C_{20}$-monocarboxylic acid or a mixture of these telogens over a heterogeneous supported catalyst which comprises a catalytically active amount of an oxygen-containing molybdenum and/or tungsten compound on an oxidic support material and which has been calcined at from 500° C. to 1000° C. after application of the precursor compounds of the oxygen-containing molybdenum and/or tungsten compounds onto the support material precursor, wherein the catalyst is activated by treatment with a reducing agent before it is used as a polymerization catalyst.

Polymerization catalysts used in the process of the present invention are supported catalysts which comprise an oxidic support material and oxygen-containing molybdenum or tungsten compounds or mixtures thereof as catalytically active compounds and which can, if desired, additionally be doped with sulfate and/or phosphate groups. To convert them into their catalytically active form, the supported catalysts are subjected to calcination at from 500° C. to 1000° C. after application of the precursor compounds of the catalytically active, oxygen-containing molybdenum and/or tungsten compounds onto the support material, with the support material and the precursor compound being converted into the catalyst.

The catalysts, their preparation and their use in the processes for preparing polytetrahydrofuran, polytetrahydrofuran diesters of $C_2$–$C_{20}$-monocarboxylic acids or polytetrahydrofuran monoesters of $C_1$–$C_{10}$-monocarboxylic acids are described in detail in DE 44 33 606 or WO 96/09335, which are hereby expressly incorporated by reference. The use of the telogen 2-butyne-1,4-diol is described in detail in the German Patent Application No. 19507399.1 (=PCT Application PCT/EP96/00702) and No. 19527532.2 (=PCT Application PCT/EP96/03297).

According to the present invention, the activity of the catalysts is increased by treatment with a reducing agent after calcination and before use as polymerization catalysts. The reducing agent is oxidized at least partially to an oxidation product or a mixture of oxidation products.

Suitable reducing agents are in principle all reducing agents which do not leave any residues on the catalysts treated therewith or only leave residues which are inert in the polymerization of tetrahydrofuran and which do not adversely affect the use of the polymerization products.

In general, it is advantageous to use reducing agents which, during the reduction of the catalyst, are converted only into oxidation products which are inert toward the catalyst and escape in gaseous form. However, it is equally advantageous to use reducing agents whose oxidation products are not gaseous but can be removed from the catalyst with a solvent or suspension medium used in the reduction or with the liquid reducing agent and are inert toward the catalyst. It is in principle also possible to use reducing agents whose oxidation products cannot be separated from the catalyst as long as the oxidation products are inert toward the catalyst and the components of the polymerization reaction. This procedure can even be advantageous, particularly when the oxidation products act as promoter for the catalyst, i.e. promote the polymerization reaction, or when the advantage of one less process step, namely the removal of the oxidation products, outweighs the possible disadvantage of a certain proportion of inert volume in the reactor.

Reducing agents which can be used are, for example, organic compounds which have a reducing action on the catalysts in their calcined form, for instance alcohols, aldehydes, carboxylic acids or carbohydrates, with bifunctional or polyfunctional compounds such as hydroxyacids, hydroxyaldehydes, polyalcohols, dialdehydes or polyaldehydes or diacids or polyacids or salts of organic reducing agents, preferably the ammonium salts, likewise being able to be used.

Examples of organic reducing agents which can be used according to the present invention are straight-chain or branched aldehydes having from one to ten carbon atoms, for example formaldehyde or acetaldehyde, propionaldehyde, butyraldehyde, isobutyraldehyde or glyoxal, straight-chain, branched or cyclic monocarboxylic or dicarboxylic acids or their salts, for example formic acid, ammonium formate, acetic acid, propionic acid, butyric acid, isobutyric acid, oxalic acid, lactic acid, benzoic acid, citric acid or ascorbic acid, straight-chain, branched or cyclic alcohols or carbohydrates such as methanol, ethanol, propanol, isopropanol or aldoses such as glucose.

Examples of inorganic reducing agents which can be used according to the present invention are hydrogen-containing compounds such as hydrides, for example alkali metal tetrahydridoborates such as sodium tetrahydridoborate, 9-borabicyclononane, catecholborane, a solution of diborane in tetrahydrofuran or in other ethers, alkali metal tetrahydridoaluminates such as lithium tetrahydridoaluminate, or simple binary hydrides such as the hydrides of the alkali or alkaline earth metals, eg. lithium hydride, sodium hydride or calcium hydride.

However, it is equally possible to use compounds which do not contain hydridic hydrogen but have a reducing action. Examples of such reducing agents are phosphites or hypophosphites such as ammonium phosphite or ammonium hypophosphite or sulfites or hydrogensulfites such as ammonium sulfite or ammonium hydrogensulfite. In this case, phosphate- or sulfate-doped catalysts are obtained automatically in the reducing treatment. However, this procedure is not absolutely necessary in order to prepare sulfate- or phosphate-doped catalysts; these can also be prepared by reducing treatment of a sulfate- or phosphate-doped catalyst. In general, the optimum amount of phosphate- or sulfate-dopant in the catalyst will not be exactly the amount obtained when using the amount of phosphites, hypophosphites, sulfites or hydrogensulfites which is optimum for the reaction. In these cases, either the amount of these dopants on the catalyst has to be increased to the desired value by addition of sulfate or phosphate, or the reduction of the catalyst has to be continued to the desired extent by further hydrogenation using another reducing agent.

Preferred reducing agents are hydrogen-containing gases such as pure hydrogen or hydrogen in admixture with other gases. Particular preference is given to using hydrogen either in pure form or diluted with an inert gas such as nitrogen or argon. For example, mixtures of nitrogen and hydrogen are very suitable. Such mixtures can comprise up to about 60% by volume of hydrogen in nitrogen; hydrogen contents of up to 40% by volume or 20% by volume are likewise suitable. However, a hydrogen content of up to 10% by volume is generally sufficient. The hydrogen content can also be increased gradually over the course of the reduction reaction in order to avoid an excessively strong exothermic reaction at the beginning. Thus, for example, an inert gas/hydrogen volume ratio of about 99:1 (or even higher, for instance 99.5:0.5) can be used at the beginning, and this is generally decreased over the course of the reduction since otherwise the reduction times required increase. Ratios of, for example, 98:2, 95:5, 90:10, 80:20, 60:40, 50:50 or even lower values right through to pure hydrogen can be set successively or directly; a more finely stepped transition between the mixtures having different hydrogen concentrations right through to a continuous rise in the proportion of hydrogen can also be employed. The rate at which the proportion of hydrogen is increased and the final value of this hydrogen content are advantageously set as a function of the heat liberated during the reduction so that excessive evolution of heat is avoided. Evolution of heat is excessive, for example, when the heat of reaction liberated can no longer be removed by the cooling system of the reduction reactor. Heat evolution is also excessive, for example, when the catalyst, as a result of the heat of reaction liberated, reaches temperatures which are detrimental to its properties in the polymerization, for instance when the catalyst melts, sinters or changes thermally to at least some extent in some other way, for example by thermal decomposition or vaporization of organic constituents such as extrusion or tabletting aids.

The treatment of the calcined catalyst with the reducing agent is generally carried out at from 20° C. to 500° C. If the reduction is carried out using hydrogen-containing gases, the preferred temperature is in the range from 100° C. to 400° C. However, if the reduction is carried out using solid, liquid or dissolved reducing agents, the preferred reduction temperature is in the range from 20 to 200° C.

If the reduction is not carried out by treating the catalyst with gaseous materials, the pressure used is generally unimportant. However, if in this case the reducing agent is converted completely or partially into gaseous oxidation products during the reduction of the catalyst, the reaction pressure used should not hinder the formation of these gaseous oxidation products: a pressure which is not overly high is thus generally advantageous. It can be, for example, from 0.1 to 5 bar (absolute). The reduction is preferably carried out under atmospheric pressure. If the reduction is carried out using gaseous reducing agents, it can be carried out at atmospheric pressure or increased pressure, for example from 1 to 300 bar (absolute) and preferably from 1 to 50 bar (absolute).

The reduction time is generally from 10 minutes to 100 hours, preferably from 30 minutes to 50 hours and particularly preferably from 1 hour to 24 hours.

The reducing agent is generally used in an amount of from 0.01 to 100 mol, in particular from 0.1 to 50 mol, per gram of the calcined catalyst and preferably in an amount of from 0.1 to 10 mol per gram of the calcined catalyst.

The reduction temperature, the reduction time and the amount of reducing agent which are optimum for a given composition of the calcined catalyst have to be determined empirically for the individual case within the general ranges indicated by routine reduction experiments and reaction tests, since they depend on the amount of active component in the catalyst, the type of active component, the type of support and the type and amount of dopants. In general, the reduction is complete when the evolution of heat which usually occurs at the beginning of the reduction has essentially abated, and this can be followed by a further reduction time of from 5 minutes to 5 hours, advantageously from 10 minutes to 2 hours.

The reduction can be carried out by treatment of the catalyst with a liquid containing the reducing agent. For example, the catalyst can be treated with a solution or suspension of the reducing agent in a suitable solvent or suspension medium. The selection of this solvent is subject to the general conditions that the catalyst has to be virtually insoluble therein and that the reducing agent has to be sufficiently soluble therein. The selection of the suspension medium is subject to the general conditions that the catalyst has to be virtually insoluble therein and that the suspension medium has to be virtually inert toward the reducing agent. There is no sharp dividing line between solution and suspension since it is possible for part of the reducing agent to be dissolved and a further part to be suspended in undissolved form. The solvent or suspension medium can be selected routinely by means of a solubility table. Examples of solvents or suspension media are water or alcohols having from one to ten carbon atoms, eg. methanol, ethanol, propanol, isopropanol and butanol, aliphatic, branched or unbranched or cyclic ethers such as diethyl ether, di-n-butyl ether, methyl tert-butyl ether, ethyl tert-butyl ether, monoethylene, diethylene and triethylene glycol dimethyl ethers or tetrahydrofuran or aliphatic, branched or unbranched or cyclic or aromatic hydrocarbons having from five to ten carbon atoms, eg. pentane, hexane, benzene, toluene, xylene, tetralin or decalin.

The reduction can likewise be carried out by treating the catalyst with a liquid reducing agent without addition of a solvent.

For this reductive treatment of the catalyst with a reducing agent present in a liquid phase, the catalyst can be arranged as a fixed bed in a reactor and have the liquid passed through it or can be present as a suspension. The latter method can be advantageous, for example, if the catalyst is in the form of powder and is only made into shaped bodies after the reduction step. Suitable reactors are, for example, stirred vessels or loop reactors having internal or external reflux. The reduction is advantageously carried out directly in the polymerization reactor.

The reduction can also be carried out by treating the solid catalyst with a solid reducing agent. For example, calcined catalyst powder can be mixed with a solid reducing agent and shaped and then reduced by heating to the reduction temperature.

After the reduction of the catalyst with a reducing agent present in a liquid or solid phase, a washing step can be carried out in order to remove residues of the reducing agent or its oxidation products from the catalyst. For this purpose, the catalyst can be slurried with a pure solvent which is able to dissolve the residues of the reductive treatment which are to be removed from the catalyst, similar to the procedure in the reduction, or can be washed with this solvent. Examples of solvents which can be used are the abovementioned solvents for the reducing agents. It goes without saying that to remove oxidized reducing agent residues which are insoluble in the solvent used for this reducing agent, another solvent has to be used for the washing step. The selection of this solvent is subject to the general conditions that the catalyst has to be virtually insoluble therein and that the residues to be removed have to be sufficiently soluble therein, and the solvent can be selected routinely with the aid of a solubility table.

The reduction is preferably carried out by treating the catalyst with a gaseous reducing agent and particularly preferably by treating the catalyst with a mixture of hydrogen and nitrogen. For this purpose, the catalyst in the form of powder or shaped bodies is advantageously arranged in a fixed-bed reactor and the hydrogen-containing gas mixture is made to flow through the catalyst bed. The reactor has a temperature regulation system which, on the one hand, is able to remove the heat liberated during the reaction and, on the other hand, can dissipate the reaction temperature required. After the hydrogenation, the catalyst can be made into shaped bodies if this has not already been done before the hydrogenation.

EXAMPLES

Preparation of the Catalysts

Catalyst A [20% $WO_3/TiO_2$]

Catalyst A was prepared by adding 4400 g of titanium dioxide to a solution of 850 g of tungstic acid in 4860 g of 25% strength aqueous $NH_3$ solution. This mixture was kneaded for 60 minutes and then dried for 12 hours at 120° C. The powder obtained after sieving was tableted and the resulting pellets (7×7×3 mm) were subsequently calcined for 2 hours at 650° C. The catalyst had a tungsten content, calculated as tungsten trioxide, of 20% by weight, based on the total weight of the catalyst.

Catalyst B

Catalyst B was prepared from catalyst A: 30 g of catalyst A were heated at 300° C. in a quartz tube at atmospheric pressure in a stream of pure hydrogen (35 l/h) for 30 hours and subsequently cooled to room temperature under nitrogen.

Catalyst C

Catalyst C was prepared from catalyst A: 50 g of catalyst A were heated at 300° C. in a quartz tube at atmospheric pressure in a stream of pure hydrogen (35 l/h) for 6 hours and subsequently cooled to room temperature under nitrogen.

Catalyst D (Comparative catalyst)

Catalyst D was prepared from catalyst A: 50 g of catalyst A were heated at 300° C. in a quartz tube at atmospheric pressure in a stream of pure nitrogen (35 l/h) for 30 hours and subsequently cooled to room temperature under nitrogen.

Catalyst E

Catalyst E was prepared by adding 6300 g of titanium dioxide to a solution of 1275 g of tungstic acid in 7300 g of 25% strength aqueous $NH_3$ solution. This mixture was kneaded for 60 minutes and then dried for 12 hours at 120° C. The powder obtained after sieving was tableted and the resulting pellets (3×3 mm) were subsequently calcined for 2 hours at 690° C. The catalyst had a tungsten content, calculated as tungsten trioxide, of 20% by weight, based on the total weight of the catalyst Catalyst F Catalyst F was prepared from catalyst E: 50 g of catalyst E were heated at 300° C. in a quartz tube at atmospheric pressure in a stream of pure hydrogen (35 l/h) for 12 hours and subsequently cooled to room temperature under argon.

Catalyst G

Catalyst G was prepared by adding 200 g of titanium dioxide to a solution of 53 g of tungstic acid in 200 g of 25% strength aqueous $NH_3$ solution. This mixture was kneaded for 150 minutes and then dried for 12 hours at 120° C. The powder obtained after sieving was extruded and the resulting extrudates (2.5 mm) were subsequently calcined for 2 hours at 675° C. The catalyst had a tungsten content, calculated as tungsten trioxide, of 20% by weight, based on the total weight of the catalyst.

Catalyst H

Catalyst H was prepared from catalyst G: 100 g of catalyst G were heated at 300° C. in a quartz tube at atmospheric pressure in a stream of pure nitrogen (40 l/h) for 30 minutes, 4 l/h of hydrogen were subsequently mixed into the stream of nitrogen and the catalyst was reduced for 12 hours at 300° C. using this gas mixture. It was subsequently cooled to room temperature under nitrogen.

Catalyst I

Catalyst I was prepared by adding 18 kg of zirconium hydroxide to a solution of 4.25 kg of tungstic acid in 23.1 kg of 25% strength $NH_3$ solution. This mixture was kneaded for 30 minutes and then dried for 11 hours at 120° C. The powder obtained after sieving was tableted and the resulting pellets (3×3 mm) were subsequently calcined for 4 hours at 675° C. The catalyst had a tungsten content, calculated as tungsten trioxide, of 20% by weight, based on the total weight of the catalyst.

Catalyst K

Catalyst K was prepared from catalyst I: 50 g of catalyst I were heated at 300° C. in a quartz tube at atmospheric pressure in a stream of pure hydrogen (35 l/h) for 29 hours and subsequently cooled to room temperature under argon.

Batchwise THF polymerization

The batchwise polymerization experiments were carried out at atmospheric pressure under a nitrogen atmosphere in 100 ml glass flasks fitted with reflux condensers. 10 g of shaped catalyst bodies which had been dried for 18 hours at 180° C./0.3 mbar before use to remove adsorbed water were heated at 50° C. in 20 g of butanediol-containing THF (butanediol concentration: 2000 ppm) for 24 hours. Water-containing THF (1% of $H_2O$) was subsequently added to the reaction mixture and the catalyst was separated off by filtration. After washing the catalyst three times with 20 g of THF each time, the filtrates were combined and evaporated at 70° C./20 mbar on a rotary evaporator and subsequently for 30 minutes at 150° C./0.3 mbar in a bulb tube. PTHF obtained as distillation residue was weighed and analyzed by means of gel permeation chromatography (GPC). Table 1 shows the test results obtained from the catalysts A to K.

The polydispersity D as a measure of the molecular weight distribution of the polymers prepared in the examples was calculated from the ratio of the weight average molecular weight ($M_w$) and the number average molecular weight ($M_n$) according to the equation $$D = M_w/M_n.$$

$M_w$ and $M_n$ were determined by means of GPC, with a standardized polystyrene being used for calibration. From the chromatogram obtained, the number average $M_n$ was calculated according to the equation $$M_n = \Sigma c_i / \Sigma(c_{i/Mi})$$

and the weight average $M_w$ was calculated according to the equation $$M_w = (\Sigma(c_i * M_i))/\Sigma c_i,$$

where $c_i$ is the concentration of the individual polymer species i in the polymer mixture and $M_i$ is the molecular weight of the individual polymer species i.

TABLE 1

| Example | Catalyst | Catalyst pre-treatment | Yield [%] | $M_n$ (GPC) | D (GPC) |
|---|---|---|---|---|---|
| 1 (Comparison) | A | — | 29 | 6680 | 2.7 |
| 2 | B | $H_2$ | 44 | 9710 | 2.8 |
| 3 | C | $H_2$ | 38 | 7260 | 2.6 |
| 4 (Comparison) | D | $N_2$ | 30 | 7680 | 2.6 |
| 5 (Comparison) | E | — | 18 | 5580 | 2.5 |
| 6 | F | $H_2$ | 21 | 3970 | 2.4 |
| 7 (Comparison) | G | — | 36 | 6850 | 3.9 |
| 8 | H | $H_2$ | 39 | 6870 | 3.7 |
| 9 (Comparison) | I | — | 30 | 9090 | 3.6 |
| 10 | K | $H_2$ | 33 | 9300 | 3.7 |

In all cases, the catalysts activated by reduction display a significant yield increase compared with the unreduced catalysts and compared with the catalyst from Comparative Experiment 4 in which hydrogen was replaced by nitrogen. This Comparative Experiment 4 shows that the effect of the activation is achieved not only by a further thermal treatment of the catalyst, but by treatment with a reducing agent.

The number average molecular weight of the PTHF obtained remains essentially unaffected. Fluctuations of this value within the observed ranges can be easily compensated, where desired, by adapting the telogen content. The polydispersity, ie. the width of the molecular weight distribution obtained, which is an important measure of the quality of the polymerization process and the properties of the polymer obtained, is not significantly altered by the activation of the catalyst.

The examples show that, by virtue of their significantly increased activity, the catalysts of the present invention lead to considerably improved economics of the process.

What is claimed is:

1. A process for preparing polytetrahydrofuran, copolymers of tetrahydrofuran and 2-butyne-1,4-diol, diesters of these polymers with $C_2$–$C_{20}$-monocarboxylic acids or monoesters of these polymers with $C_1$–$C_{10}$-monocarboxylic acids, which comprises polymerizing tetrahydrofuran in the presence of at least one of the telogens water, 1,4-butanediol, 2-butyne-1,4-diol, polytetrahydrofuran having a molecular weight of from 200 to 700 Dalton, a $C_1$–$C_{20}$-monocarboxylic acid or an anhydride of a $C_2$–$C_{20}$-monocarboxylic acid or a mixture thereof over a heterogeneous supported catalyst, which catalyst comprises a catalytically active amount of an oxygen-containing molybdenum or tungsten compound or both on an oxidic support material and which has been calcined at from 500° C. to 1000° C. after application of the precursor compounds of the oxygen-containing molybdenum and/or tungsten compounds onto the support material precursor, wherein the catalyst is activated by treatment with a reducing agent prior to use as a polymerization catalyst.

2. The process of claim 1, wherein the reducing agent used is a hydrogen-containing gas.

3. The process of claim 2, wherein the reducing agent used is a mixture of hydrogen and an inert gas.

4. The process of claim 3, wherein the inert gas used is argon or nitrogen or a mixture thereof.

5. The process of claim 4, wherein the proportion of hydrogen in the gas mixture is changed over the course of the reduction.

6. The process of claim 1, wherein the reduction of the catalyst is carried out at from about 20 to 500° C.

7. The process of claim 6, wherein the reduction of the catalyst is effected by a hydrogen-containing gas at a temperature of from about 100 to 400° C.

8. The process of claim 6, wherein the reduction of the catalyst is effected by a solid, liquid or dissolved reducing agent at a temperature of from about 20 to 200° C.

* * * * *